Aug. 21, 1951  M. GRAVINA  2,564,841
PILOT CLUTCH AND BRAKE FOR CENTRIFUGAL CLUTCHES
Filed Nov. 19, 1947  2 Sheets-Sheet 1

INVENTOR
MICHEL GRAVINA
BY
Bailey, Stephens and Huettig
ATTORNEYS

Aug. 21, 1951    M. GRAVINA    2,564,841
PILOT CLUTCH AND BRAKE FOR CENTRIFUGAL CLUTCHES
Filed Nov. 19, 1947    2 Sheets-Sheet 2

INVENTOR
MICHEL GRAVINA
BY
ATTORNEYS

Patented Aug. 21, 1951

2,564,841

UNITED STATES PATENT OFFICE 2,564,841

PILOT CLUTCH AND BRAKE FOR CENTRIFUGAL CLUTCHES

Michel Gravina, Paris, France

Application November 19, 1947, Serial No. 787,019
In France November 23, 1946

2 Claims. (Cl. 192—12)

The present invention relates to clutch systems of the kind including centrifugal control means adapted to be either coupled with the driving unit, so as to engage the clutch, or braked, to disengage the clutch.

The object of my invention is to provide a device of this kind which is better adapted to meet the requirements of practice than those used for similar purposes up to this time.

Figure 1:
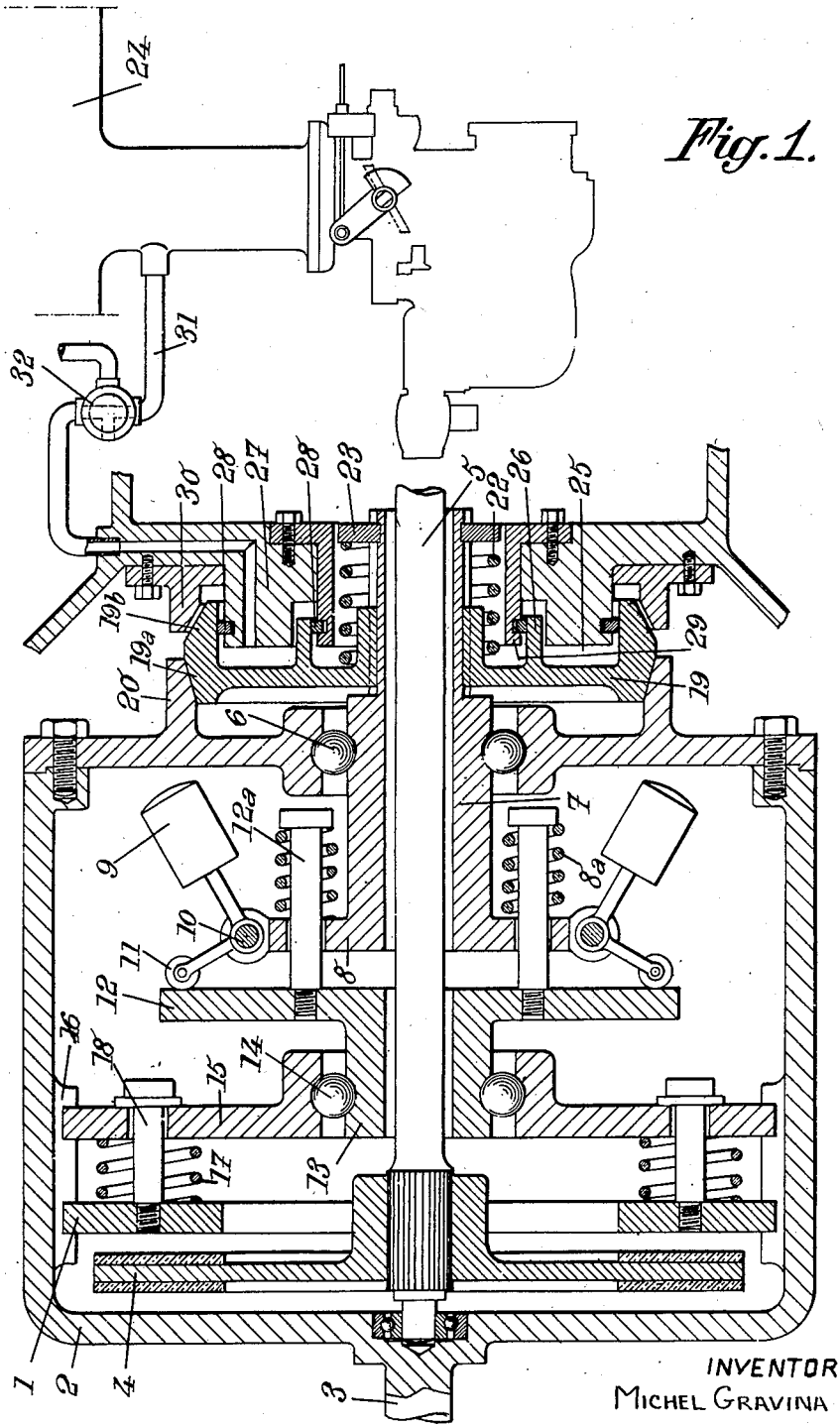
Figure 2:
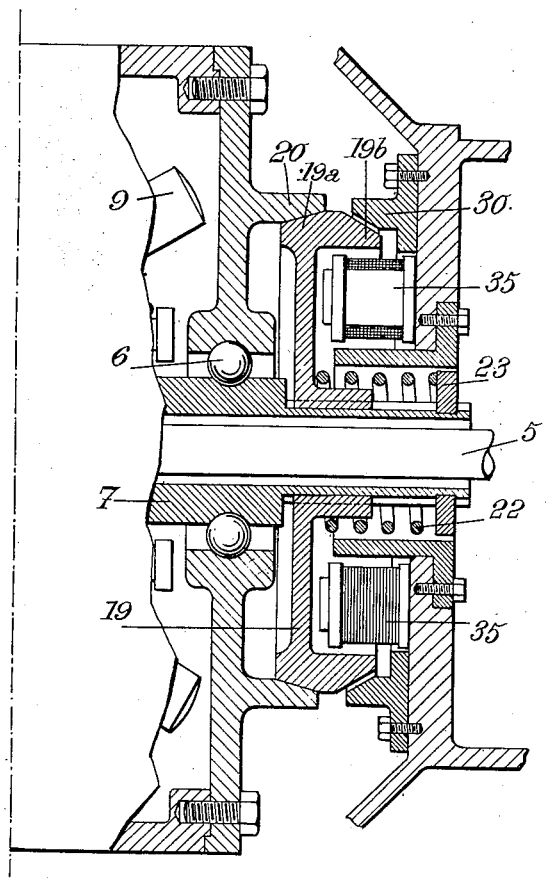

A preferred embodiment of my invention will be hereinafter described with reference to the accompanying drawings, given merely by way of example, and in which:

Fig. 1 of the drawing is a diagrammatic axial section of a clutch device provided with control means made according to an embodiment of the invention;

Fig. 2 is a partial view of another embodiment.

In the embodiments illustrated by the drawing, the clutch system, which, as a whole, may be of any conventional or other construction, is for instance made as follows:

It includes, essentially, a disc 1, driven in rotation by a casing 2 keyed on the shaft 3 of the engine (and which may constitute the flywheel), and a disc 4, mounted to rotate together with a receiver shaft 5 and adapted to be caught between disc 1 and the adjacent wall of casing 2, in clutch engagement therewith.

I make use, for bringing disc 1 into contact with disc 4, of a centrifugal control system the elements of which are rigid neither with the driving parts nor with the receiver parts of the clutch.

For this purpose, a sleeve 7, rigid with a disc 8 which constitutes a support for centrifugal weights 9 pivoted about axes 10, is mounted on shaft 5 so as to be free to rotate thereon but to be prevented from moving axially with respect thereto, by means of a ball bearing 6, which constitutes a thrust bearing with respect to casing 2. These centrifugal weights act, through levers, cams, etc., 11, upon a disc 12 coupled with disc 8 to rotate together therewith, by means of guiding pins 12a fixed in disc 12, but adapted to be moved away therewith in the axial direction under the effect of the centrifugal weights and against the action of springs 8a interposed between disc 8 and collars provided on pins 12a.

I then fit another disc 15 on a sleeve 13 in line with disc 12, through the intermediate of a ball bearing 14 which prevents any axial displacement of said disc 15 with respect to said sleeve. Disc 15 is caused to rotate together with casing 2 by means of the same ribs 16 which couple said casing 2 with disc 1.

I further interpose between discs 1 and 15 springs 17 disposed around guiding pins 18.

Finally, I provide a wheel 19 on the end portion of sleeve 7, ribs formed on said end portion enabling said wheel 19 to move axially on sleeve 7, while connecting it in rotation therewith.

With such an arrangement, if a conical surface 19a of the periphery of wheel 19 is caused to engage a corresponding conical surface 20 of casing 2, the centrifugal weights 9 are driven in rotation by shaft 3 and cause engagement of the clutch device 4—1—2.

If surface 19a is moved away from surface 20 and wheel 19 is braked by applying the surface 19b thereof against a fixed surface, such as 30, a practically instantaneous disengagement of the clutch is obtained.

Clutch engagement is produced by the action of a permanently stressed spring on wheel 19.

Clutch disengagement is obtained by overcoming the action of this spring, for instance, in the example shown by Fig. 1, by subjecting wheel 19 to the controlled action of the engine suction.

The spring that urges wheel 19 toward clutch engagement position is preferably constituted by a cylindrical spiral spring 22 coaxial with sleeve 7 and extending between a flange 23 thereof and wheel 19. As this spring is interposed between two parts that rotate together, it undergoes neither sliding nor twisting.

As for the action of the engine suction upon wheel 19, it is obtained by giving said wheel and a corresponding portion of the fixed part of the system shapes such that they form together a variable volume chamber adapted to be placed in communication with the engine induction pipe 24.

For instance, as shown by the drawing, wheel 19 is formed with an annular groove 25 between its rim portion 19b and a cylindrical flange 26 concentric therewith. And an annular projection 27 is provided on the fixed clutch casing. Packing rings 28 are provided on the one hand between the rim of wheel 19 and the outer cylindrical wall of projection 27 and on the other hand between flange 26 and a cylindrical flange 29 rigid with projection 27.

The conical part 30 that cooperates with the surface 19b of wheel 19 is also carried by projection 27.

The closed chamber 25 thus formed between wheel 19 and projection 27 is placed in communication with the induction pipe 24 of the vehicle engine through conduits provided in part 27 and a pipe 31 provided with a cock 32 adapted to connect the inside of said chamber 25 either with suction pipe 24 or with the atmosphere.

Thus, when the engine is running normally, clutch disengagement is obtained by operating cock 32 to place chamber 25 in communication with induction pipe 24, whereby the engine suction, overcoming the action of spring 22, brings surface 19b into contact with fixed surface 30 which brakes the rotation of sleeve 7 and disc 8 and therefore of the centrifugal masses 9, which yield to the action of springs 8a.

It should be noted that the engine can always be started and accelerated alone, that is to say without driving the vehicle.

It will be supposed, for instance, that, according to a preferred arrangement, cock 32 is controlled in any suitable manner so that closing of the engine ignition circuit automatically places chamber 25 in communication with the engine manifold 24, where there is still no suction since the engine is not yet started. Furthermore, although disc 8 is always coupled, when the engine is stopped, with casing 2 through wheel 19, under the action of spring 22, the clutch is not yet in engagement since the engine is not running. It is therefore possible to start said engine alone. As soon as suction is developed in manifold 24, wheel 19 is braked by engagement with surface 20. The centrifugal weight carrying disc 8 cannot rotate and engagement of the clutch is therefore not possible. The engine can be accelerated alone.

To engage the clutch it suffices to act on cock 32 to connect chamber 25 with the atmosphere.

Advantageously, when the clutch device, as in the example illustrated by the drawing, is to co-operate with a gear box or any other device the operation of which is combined with that of the clutch, the means for controlling cock 32 and the means for controlling the gear box or the like are interconnected, whereby a single motion of the driver suffices to perform the desired operation.

An advantage of the embodiment above described is that it can work without use of a source of electric current (as is necessary when wheel 19 is operated through electromagnetic means) so that current breakdowns have no effect thereon.

But it should be well understood that the above description of the embodiment illustrated by the drawing has no limitative character and changes might be brought thereto without departing from the principle of my invention.

For instance, whereas the provision of thrust ball bearings for connecting together various elements of the device as above described is advantageous, this is by no means a necessary feature of my invention.

Likewise, control of the axial displacements of wheel 19 might, according to another embodiment of my invention illustrated by Fig. 2, be ensured by means of an electro-magnet 35 carried by the fixed portion of the device and acting upon said wheel 19. This construction has, like the one above described with reference to the drawing, the advantage that spring 22 is interposed between two elements that rotate together.

What I claim is:

1. A system which comprises, in combination, a frame, driving and driven means journalled in said frame, an internal combustion engine for actuating said driving means, a clutch device for interconnecting said driving and driven means, centrifugal means for controlling said clutch device, a rotary part fixed axially with respect to said driving means and rotatable together with said centrifugal means, means slidable axially with respect to said part but rotatable together therewith for coupling said part with said driving means, a constantly stressed spring interposed between said coupling means and said rotary part to urge said coupling means axially toward coupling position with respect to said driving means, means carried by said frame to be engaged by said coupling means for braking thereof and means operative by the suction of said engine for holding said coupling means away from said coupling position and in engagement with said braking means.

2. A system which comprises, in combination, a frame, driving and driven means journalled in said frame, an internal combustion engine for actuating said driving means, a clutch device for interconnecting said driving and driven means, centrifugal means for controlling said clutch device, a rotary part fixed axially with respect to said driving means and rotatable together with said centrifugal means, means slidable axially with respect to said part but rotatable together therewith for coupling said part with said driving means, a constantly stressed spring interposed between said coupling means and said rotary part to urge said coupling means axially toward coupling position with respect to said driving means, means carried by said frame to be engaged by said coupling means for braking thereof, means including at least one conduit for subjecting said coupling means to the action of the engine suction to hold said coupling means away from said coupling position and in engagement with said braking means, and valve means for connecting at will said conduit with the atmosphere.

MICHEL GRAVINA.

REFERENCES CITED

The following references are of record in the file of this patent:

UNITED STATES PATENTS

| Number | Name | Date |
|---|---|---|
| 1,425,782 | Krause | Aug. 15, 1922 |
| 1,925,897 | Fawick | Sept. 5, 1933 |
| 2,074,510 | Junkers | Mar. 23, 1937 |
| 2,197,470 | Hodgkins | Apr. 16, 1940 |
| 2,197,480 | Neill | Apr. 16, 1940 |
| 2,315,298 | Thompson | Mar. 30, 1943 |
| 2,422,155 | Wemp | June 10, 1947 |
| 2,447,007 | Gravina et al. | Aug. 17, 1948 |
| 2,465,601 | Ochtman | Mar. 29, 1949 |

FOREIGN PATENTS

| Number | Country | Date |
|---|---|---|
| 874,809 | France | Aug. 27, 1942 |